(12) United States Patent  
Robillard

(10) Patent No.: US 7,774,763 B1  
(45) Date of Patent: Aug. 10, 2010

(54) TECHNIQUES FOR FORMING A MULTI-TASKING EXECUTABLE PROGRAM AND USING THE SAME

(75) Inventor: Michael N. Robillard, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1208 days.

(21) Appl. No.: 11/158,769

(22) Filed: Jun. 22, 2005

(51) Int. Cl.
G06F 9/44 (2006.01)
G06F 9/45 (2006.01)

(52) U.S. Cl. .................. 717/140; 717/136; 717/162

(58) Field of Classification Search .................. None
See application file for complete search history.

(56) References Cited

U.S. PATENT DOCUMENTS 6,363,473 B1 * 3/2002 Volentine et al. ............ 712/202
6,802,060 B1 * 10/2004 Shann ........................ 717/162
7,020,768 B2   3/2006 Swaine et al. ............... 712/228

OTHER PUBLICATIONS

Dave Wallenberg, "System Monitoring in Multitasking Environments", http://www.os2ezine.com/v1n8/monitor.html, Copyright 1996—Falcon Networking.*

* cited by examiner

Primary Examiner—Lewis A Bullock, Jr.
Assistant Examiner—Mark A Gooray
(74) Attorney, Agent, or Firm—BainwoodHuang

(57) ABSTRACT

An improved multi-tasking executable program has executable code which includes a main section defined by a main portion of source code, and a set of task sections defined by a set of task portions of the source code. Each task section has (i) a "jump_to_address" section defined by expansion of a "jump_to_address" macro of the source code, and (ii) multiple entry points defined by multiple expansions of a "breakout" macro of the source code. When the executable code is executed by a processor of the subsystem, the main section is configured to invoke each task section in a cyclical manner, and the "jump_to_address" section of each task section is configured to jump execution to one of the multiple entry points of that task section.

8 Claims, 4 Drawing Sheets

54(B)

```
// include.h
#define breakout(x,y)     — 56
({
    proc[pid].goto_address = &&next;
    proc[pid].state = x;
    proc[pid].data = y;          94
        . //
        . // other instructions (optional)
        . //
    return;
next;
        . //
        . // other instructions (optional)
        . //
})                          — 58
#define jump_to_address(x)
({
    if (pid != NOPROC) {
        goto *proc[pid].goto_address; }
    else {
        pid = newprocess(x); }
})
        . //
        . // other instructions (optional)
        . //
```

TECHNIQUES FOR FORMING A MULTI-TASKING EXECUTABLE PROGRAM AND USING THE SAME

BACKGROUND

A typical data storage system includes data storage circuitry and a power subsystem. The data storage circuitry (e.g., one or more storage processors, one or more directors, etc.) is configured to perform data storage operations on behalf of external hosts. The power subsystem is configured to provide power to the data storage circuitry, as well as monitor the operating environment to ensure safe and reliable operation of the data storage circuitry.

Due to the complex functionality and performance demands imposed on the power subsystem, many manufacturers equip the power subsystem with a dedicated microprocessor which is separate from the processors of the data storage circuitry. That is, this dedicated microprocessor is not configured to store data into and retrieve data from an array of storage devices using a preemptive scheduling operating system and specialized data storage processes as is the data storage circuitry. Rather, the dedicated microprocessor of the power subsystem executes a control program having (i) a startup portion that directs the power subsystem to provide power supply signals to the data storage circuitry in a proper sequence to ensure correct operation, and (ii) a normal operating portion to monitor the operating environment and notify the data storage circuitry if there is a sensed problem in the operating environment.

As the dedicated microprocessor of the power subsystem executes the normal operating portion of the control program, the dedicated microprocessor cycles through a variety of monitoring routines. In general, each monitoring routine directs the microprocessor to sample a signal from a sensor (e.g., an airflow sensor, a temperature sensor, a voltage sensor, etc.), and output a warning to the data storage circuitry if the sampled signal indicates that the operating environment is no longer within a prescribed operating range (e.g., if the airflow sensor indicates that airflow passing over the data storage circuitry is no longer above a predetermined threshold, if the temperature sensor indicates that the temperature of the operating environment exceeds the temperature margin of the data storage circuitry, if the voltage sensor indicates that the primary power signal is outside a safe operating range, etc.).

Since the dedicated microprocessor of the power subsystem is separate from the data storage circuitry and thus is not burdened with the task of performing data storage operations, the dedicated microprocessor typically executes the control program without the use of an overhead-intensive preemptive scheduling operating system thus avoiding the associated performance costs of such an operating system. Rather, as the dedicated microprocessor runs the control program, the control program itself task switches between the different monitoring routines in a round robin manner. That is, the microprocessor runs a segment of a first monitoring routine, then stores an address of a next segment of the first monitoring routine and jumps to a second monitoring routine, then runs a segment of the second monitoring routine, then stores an address of a next segment of the second monitoring routine and jumps to a segment of a third monitoring routine, and so on. Once the dedicated microprocessor has cycled through a segment of each routine, the microprocessor runs the next segment of each routine in the same manner. Such light-weight multitasking results in fast performance and efficient use of resources (i.e., processing time, memory, etc.).

To create the above-described control program, a programmer manually embeds labels and procedure calls into the program's source code. In particular, at the beginning of each code segment in each monitoring routine, the programmer places a unique label for entering that code segment. Additionally, at the end of each code segment, the programmer places a procedure call for storing the address of the next segment of the current routine (i.e., an entry point), exiting that routine and jumping to the next routine. The procedure calls reference the unique labels as parameters in order to remember where to continue execution of each routine when it is time to continue execution of that routine.

For example, the following monitoring routine is configured to continuously perform nine instructions arranged as a series of three code segments.

```
        go_to_code_segment(x);
        while (1) {
entry_point_1:  instruction_1;
                instruction_2;
                instruction_3;
                jump_to_next_monitoring_routine(entry_point_2);
entry_point_2:  instruction_4;
                instruction_5;
                instruction_6;
                jump_to_next_monitoring_routine(entry_point_3);
entry_point_3:  instruction_7;
                instruction_8;
                instruction_9;
                jump_to_next_monitoring_routine(entry_point_1);
        };
```

The first code segment, which starts at address "entry_point_1" (i.e., "entry_point_1" is an entry point into the first segment), includes "instruction_1", "instruction_2", "instruction_3", and "jump_to_next_monitoring_routine (entry_point_2)". The second code segment, which starts at address "entry_point_2", includes "instruction_4", "instruction_5", "instruction_6", and "jump_to_next_monitoring_routine(entry_point_3)". The third code segment, which starts at address "entry_point_3", includes "instruction_7", "instruction_8", "instruction_9", and "jump_to_next_monitoring_routine(entry_point_1)".

After the programmer compiles and links the source code, the control program is in executable form and ready to run on the dedicated microprocessor of the power subsystem. During execution, the microprocessor executes the procedure call "go_to_code_segment" which returns immediately during the initial execution but otherwise causes the microprocessor to jump to a particular code segment within the "while" loop. During the initial execution, the microprocessor then enters the "while" loop, and executes "instruction_1", "instruction_2", and "instruction_3". After the microprocessor executes "instruction_3", the microprocessor runs the procedure call "jump_to_next_monitoring_routine(entry_point_2)" which causes the microprocessor to (i) save the address "entry_point_2" in memory (i.e., "entry_point_2" is the starting point of the next segment in the current monitoring routine), (ii) exit the current monitoring routine and (ii) jump to the next monitoring routine. The microprocessor then runs a segment of each remaining monitoring routine in turn and eventually executes a procedure call which directs the microprocessor to run the current monitoring routine again. That is, the microprocessor (which had earlier saved the address "entry_point_2" in memory) re-runs the procedure call "go_to_code_segment" which now causes the microprocessor to re-enter the current monitoring routine at the address "entry_point 2" and run the next segment of code, i.e., "instruction_4", "instruction_5", "instruction_6", and "jump_to_next_monitoring_routine(entry_point_3)". The microprocessor progresses through the next segments of the remaining monitoring routines in the same manner. Accordingly, the above-described control program efficiently and effectively carries out very light-weight task switching without the use of an overhead-intensive preemptive scheduling operating system.

SUMMARY

Unfortunately, there are deficiencies to the above-described technique for creating a task switching control program. For example, the programmer's task of manually embedding a unique entry point and a procedure call with a unique parameter is extremely tedious and prone to error. In particular, it is a significant burden on the programmer to manually embed a different entry point label (e.g., "entry_point_1") at the beginning of each code segment. Additionally, it is a significant burden on the programmer to manually terminate each code segment with a procedure call having a unique label as a parameter, e.g., "jump_to_next_monitoring_routine(entry_point_2)". During such editing, if the programmer makes a mistake, it is possible that the program will compile and link without identifying any error, and then execute improperly by causing the microprocessor of the power subsystem to jump to a wrong location. Moreover, debugging and catching such an error can be an extremely difficult and time consuming effort.

In contrast to the above-described technique for creating a task switching control program which requires a programmer to embed unique entry points and exit points, an improved technique forms a task switching program through utilization of a "jump_to_address" macro and a "breakout" macro within sections of code. When the task switching program is compiled and linked, macro expansion of the "jump_to_address" macro and the "breakout" macro result in automatic unique addressing of entry points within tasks in a reliable manner, even if the same "jump_to_address" macro and/or the "breakout" macro are used several times in different locations within the tasks. Accordingly, the programmer is capable of achieving light-weight task switching without manually embedding any unique entry points and exit points. Such a program is well-suited for use in a subsystem of a data storage system.

One embodiment is directed to a subsystem for data storage equipment. The subsystem is configured to manage an operating environment of a set of processing devices (e.g., storage processors) of the data storage equipment in accordance with a multi-tasking executable program. The multi-tasking executable program is formed by (i) providing source code which includes a "jump_to_address" macro, a "breakout" macro, a main portion, and a set of task portions; (ii) compiling the source code into object code; and (iii) linking the object code into the multi-tasking executable program. The multi-tasking executable program has executable code which includes a main section defined by the main portion of the source code, and a set of task sections defined by the set of task portions of the source code. Each task section has (i) a "jump_to_address" section defined by expansion of the "jump_to_address" macro of the source code, and (ii) multiple entry points defined by multiple expansions of the "breakout" macro of the source code. When the executable code is executed by a processor of the subsystem, the main section is configured to invoke each task section in a cyclical manner, and the "jump_to_address" section of each task section is configured to jump execution to one of the multiple entry points of that task section.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a block diagram showing a framework for a macro of the multi-tasking executable program.

DETAILED DESCRIPTION

An improved technique forms a task switching program through utilization of a "jump_to_address" macro and a "breakout" macro within sections of code. When the task switching program is compiled and linked, macro expansion of the "jump_to_address" macro and the "breakout" macro result in automatic unique addressing of entry points within tasks in a reliable manner, even if the same "jump_to_address" macro and/or the "breakout" macro are used several times in different locations within the tasks. Accordingly, the programmer is capable of achieving light-weight task switching without manually embedding any unique entry points and exit points. Such a program is well-suited for use in a subsystem for data storage equipment.

Figure 1:
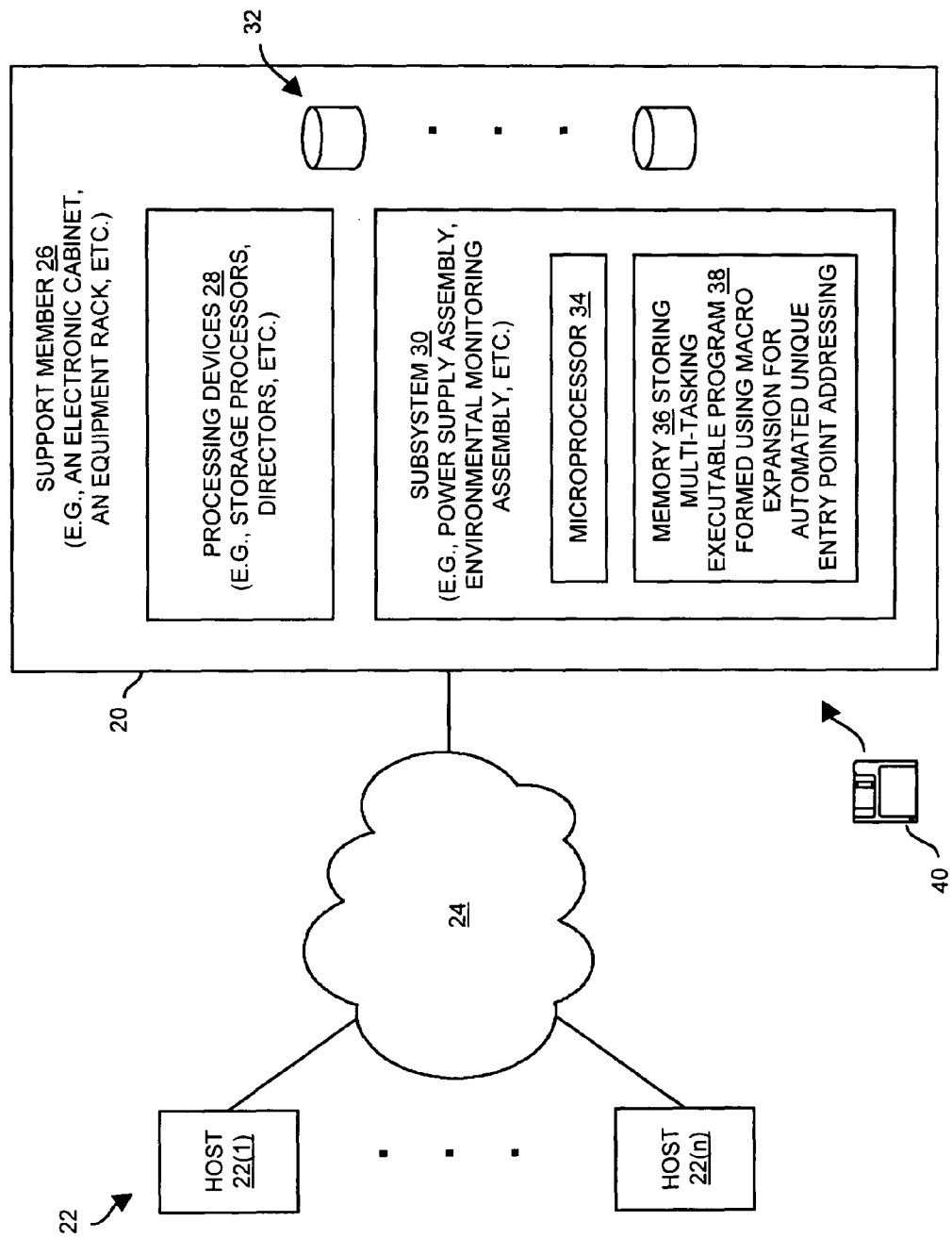
FIG. 1 is a block diagram of a data storage system having a subsystem which utilizes a multi-tasking executable program formed using macro expansion for automated unique entry point addressing.

FIG. 1 shows a data storage system 20 which is configured to store and retrieve data on behalf of a set of external hosts 22(1), . . . , 22(n) (collectively, hosts 22) that connects to the data storage system 20 through a network 24. The data storage system 20 includes a support member 26, a set of processing devices 28, a subsystem 30 and a set of storage devices 32. The support member 26 (e.g., an electronic cabinet, a standard equipment rack, a frame, etc.) is configured to provide support to the set of processing devices 28, the subsystem 30 and the set of storage devices 32. The set of processing devices 28 is configured to store data into and retrieve data from the set of storage devices 32 (e.g., an array of disk drives). The subsystem 30 performs multiple tasks (e.g., monitoring routines) for various equipment of the data storage system 20 in a light-weight task switching manner.

By way of example, the subsystem 30 is the power supply assembly which (i) provides power supply signals to the set of processing devices 28 in accordance with a predefined start-up sequence, and (ii) monitors the operating environment within the data storage system 20 (e.g., airflow, temperature, humidity, voltage, current, etc.). To this end, the subsystem 30 employs a microprocessor 34 and memory 36. The memory 36 stores a multi-tasking executable program 38 which is formed using macro expansion for automated unique entry point addressing. During operation of the data storage system 20, the microprocessor 34 executes this program 38.

A computer program product 40 is capable of delivering the multi-tasking executable program 38 to the memory 36 from an external source. Although the computer program product 40 is illustrated as a diskette by way of example only, a variety of communications and storage media are suitable for use (e.g., a set of CD-ROMs, disks, tapes, memory cards or sticks, network downloads, propagated signals, combinations thereof, etc.). In some arrangements, the memory 36 is programmable read only memory (e.g., flash EPROM) which is programmed as firmware. The program 38 is capable of being changed (e.g., upgraded, modified, etc.) at a later time (e.g., after being deployed in the field). As will be described with reference to FIGS. 2-4, the program 38 does not burden a programmer with a requirement of manually embedding source code with unique labels and procedure calls referencing the unique labels as in conventional approaches to creating a multi-tasking program. Rather, for the program 38, such identification occurs automatically through the use of macro expansion during the compile and linking process.

Figure 2:
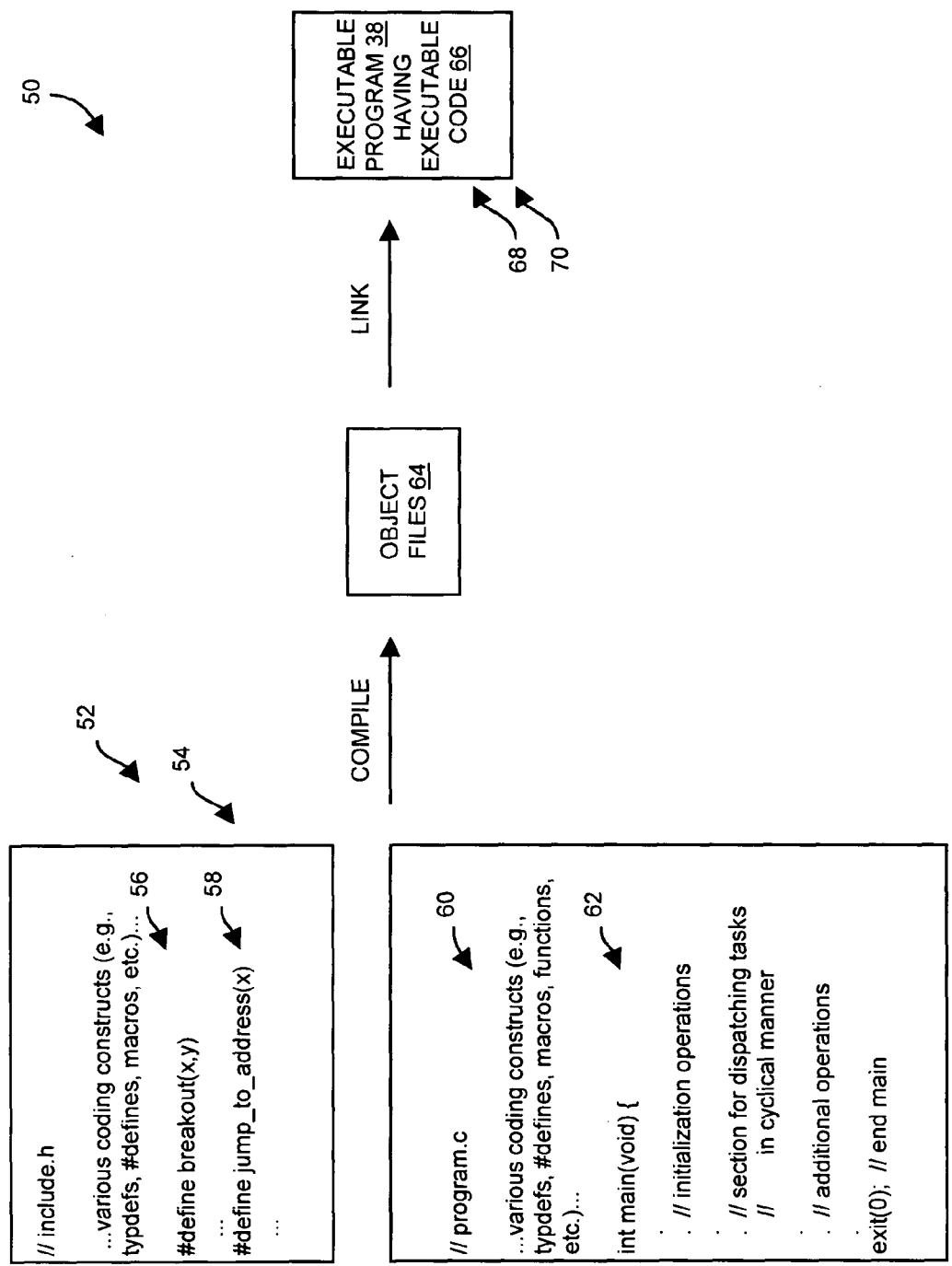
FIG. 2 is a block diagram illustrating a technique for making the multi-tasking executable program of FIG. 1.

FIG. 2 illustrates a process 50 for forming the multi-tasking executable program 38. In particular, a programmer begins by writing source code 52 which defines operations for performing a variety of tasks (e.g., tasks which are configured to monitor various sensors of the data storage system 20, and notify the set of processing devices 28 if there is a sensed problem). The programmer stores this source code 52 within a set of files 54 (i.e., one or more source code files 54). It should be understood that there are a various high-level programming languages that are well-suited for the source code 52 such as C, BASIC, Fortran, combinations thereof, etc. The use of high-level languages over lower-level languages allows the compiler and linker to determine actual addresses and offsets thus alleviating the need for the programmer to hardcode specific addresses.

As shown in FIG. 2, the source code 52 includes a macro 56 named "breakout" (hereinafter referred to as the "breakout" macro and referenced by the arrow 56), and another macro 58 named "jump_to_address" (hereinafter referred to as the "jump_to_address" macro and referenced by the arrow 58). The source code 52 further includes a set of task portions 60 (e.g., functions, routines, procedures, etc.), and a main portion 62. The main portion 62 is configured to dispatch each task portion 60 in a round robin manner. That is, the main portion 62 initially calls a first task portion 60, then when execution returns to the main portion 62, the main portion 62 calls a second task portion 60, and so on. As will be explained in further detail shortly, the use of the "breakout" macro 56 and the "jump_to_address" macro 58 enables the programmer to create the multi-tasking program 38 without the need to manually add unique labels and procedure calls that reference the unique labels.

As further shown in FIG. 2, the programmer compiles the source code 52 to generate a set of object files 64 (i.e., one or more object files 64). The programmer then links the set of object files 64 to generate the executable program 38.

The resulting executable program 38 includes executable code 66 having a set of task sections 68 (shown generally by the arrow 68) defined by the set of task portions 60 of the source code 52, and a main section 70 (shown generally by the arrow 70) defined by the main portion 62 of the source code 52. Further details will now be provided with reference to FIGS. 3 and 4.

Figure 3:
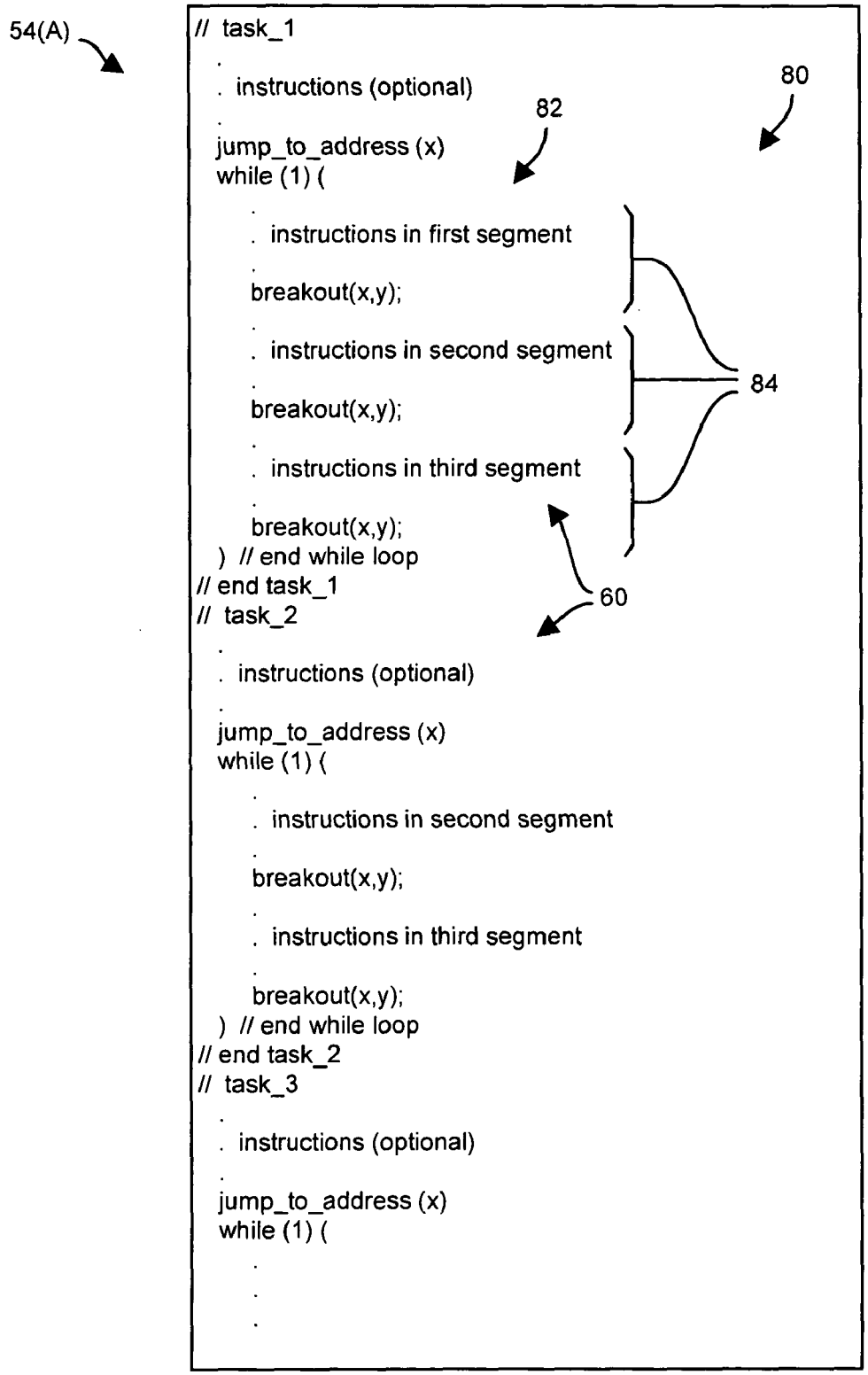
FIG. 3 is a block diagram showing a framework for a task of the multi-tasking executable program.

FIG. 3 shows a source code file 54(A) having an exemplary framework 80 for the task portions 60 (also see FIG. 2), and FIG. 4 shows another source code file 54(B) having an exemplary framework 90 for the "breakout" macro 56 and an exemplary framework 92 for the "jump_to_address" macro 58. Recall that the main portion 62 of the source code 52 (FIG. 2) is configured to call each task portion 60 in a round robin manner.

In connection with the framework for the task portions 60, each task portion 60 (FIG. 3) defines a monitoring task which is performed by the microprocessor 34, and includes a "while" loop 82 for repeating a series of operations for a particular monitoring function. For example, one such monitoring function involves the microprocessor 34 receiving a signal from an airflow sensor, and notifying the processing devices 28 if the amount of airflow through the data storage system 20 falls below a predefined amount. Another monitoring operation involves the microprocessor 34 receiving a signal from a voltage sensor from a power supply, and notifying the processing devices 28 if the voltage from the power supply is outside a prescribed operating range, and so on.

In order to task switch between the various monitoring tasks defined by the task portions 60, the programmer divides each task portion 60 into multiple segments 84 for lightweight task switching functionality. That is, before the "while" loop 82 of each task portion 60, the programmer inserts a reference to the "jump_to_address" macro 58 which expands into code configured to jump to a code segment 84 within that "while" loop 82 (also see FIG. 4). Additionally, within the "while" loop 82 of each task portion 60, the programmer inserts references to the "breakout" macro 56 which expands into code configured to separate that "while" loop 82 into multiple code segments 84. By way of example only, a first monitoring task "task_1" 60(1) is separated into three segments 84 for task switching purposes. Similarly, a second monitoring task "task_2" 60(2) is separated into two segments 84 for task switching purposes.

As shown in FIG. 4, the "breakout" macro 56 defines, among other state-saving instructions 94, code for saving an address ("&&next") in memory. The "breakout" macro 56 further defines code for jumping out of a monitoring task 60 (i.e., the "return" command) and the address label "next". When the "breakout" macro 56 expands within a task portion 60 (e.g., the task portion 60(1) in FIG. 3) at the ends of a current code segment 84, such expansion results in code which is configured to direct the microprocessor 34 to (i) save the specific address of the next code segment 84 (i.e., the address or offset of the "next" label as an entry point for the next code segment 84), and (ii) exit (or breakout of the current task portion 60) and return back to the main portion 62 of code (also see FIG. 2) so that the main portion 62 can invoke a new task portion 60 (e.g., the task portion 60(2)) and thus carry out a task switch.

When the microprocessor 34 eventually returns to execute the first task portion 60 (e.g., the task portion 60(1)), the code resulting from expansion of the "jump_to_address" macro 58 directs the microprocessor 34 to jump to the saved address and thus pickup execution at the next code segment 84. That is, the code defined by the "jump_to_address" macro 58 directs the microprocessor 34 to retrieve the saved entry point from memory and jump to that saved entry point since that saved entry point is the start of the next code segment 84 which follows the previously executed code segment 84 of that task portion 60.

It should be understood that when the compile process results in expansion of the "breakout" macro 56 and the "jump_to_address" macro 58 within each task portion 60 in an automated manner. It should be further understood that the linking process results in tying together the code into a single executable file with automatic calculation of the correct addresses within the code of each expanded macro (also see arrows 68, 70 in FIG. 2 which generally identify parts of the executable code 66). That is, the linker automatically takes care of calculating and tracking the entry point addresses (or offsets) at the occurrence of "&&next" in each expansion of the "breakout" macro 56. Accordingly, there is no need for the programmer to manually embed unique labels or procedure calls referencing the unique labels as in conventional approaches which are prone to error.

It should be understood that the program 38 is well-suited for running tasks other than simply monitoring tasks in a task switching manner. In some arrangements, the source code 52 includes one or more task portions 60 having commands to monitor the operating environment and one or more task portions have commands to perform other operations. In some arrangements, the source code 52 includes a task portion 60 having commands for interfacing with a user, i.e., the code defines a series of commands configured to receive input from the user and provide output to the user through a user interface.

As described above, an improved technique forms a task switching program 38 through utilization of a "jump_to_address" macro 56 and a "breakout" macro 58 within sections of code. When the task switching program 38 is compiled and linked, macro expansion of the "jump_to_address" macro 56 and the "breakout" macro 58 result in automatic unique addressing of entry points within tasks in a reliable manner, even if the same "jump_to_address" macro 56 and/or the "breakout" macro 58 are used several times in different locations within the tasks. Accordingly, the programmer is capable of achieving light-weight task switching without manually embedding any unique entry points and exit points. Such a program is well-suited for use in a subsystem 30 of a data storage system 20.

Moreover, it should be understood that the above-described technique does not require the use of a processor's assembly language, and further does not require detailed knowledge of the processor's architecture. For example, to make a pre-emptive task switcher, one would need to define a timer interrupt, switch context by saving state of all relevant registers (including the program counter), manage a separate "stack" for each context, etc. Such a task switcher would be significantly more complicated but provide very little gain.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the program 38 was described above as performing task switching monitoring routines in a data storage system 20 by way of example. The various techniques are suitable for other types of operations and are capable of task switching within other types of computerized systems as well.

What is claimed is:

1. A method for forming a multi-tasking executable program, the method comprising:
    providing source code which includes a "jump to address" macro, a "breakout" macro, a main portion, and a set of task portions;
    compiling the source code into object code; and
    linking the object code into the multi-tasking executable program, the multi-tasking executable program having executable code which includes:
        a main section defined by the main portion of the source code; and
        a set of task sections defined by the set of task portions of the source code, each task section having (i) a "jump_to_address" section defined by expansion of the "jump_to_address" macro of the source code, and (ii) multiple entry points defined by multiple expansions of the "breakout" macro of the source code, and
    when the executable code is executed by a processor, the main section being configured to invoke each task section in a cyclical manner, and the "jump_to_address" section of each task section being configured to jump execution to one of the multiple entry points of that task section;
    wherein linking the object code into the multi-tasking executable program includes: generating, as the multi-tasking executable program, a single executable file containing the main section of the executable code and the set of task sections of the executable code in an integrated manner;
    wherein generating includes incorporating "breakout" instructions within each task section of the executable code, the "breakout" instructions (i) being defined by the multiple expansions of the "breakout" macro of the source code, and (ii) corresponding to "return" commands located ahead of entry point address labels in the "breakout" macro of the source code;
    wherein the breakout macro includes a unique label defined within a block local to the breakout macro;
    wherein linking further includes, at link-time, assigning addresses of the multiple entry points based on the unique labels within each expansion of the "breakout" macro; and
    wherein, when the executable code is executed by the processor, the "breakout" instructions of each task section are configured to break out of that task section and return execution to the main section.

2. A method as in claim 1 wherein generating further includes incorporating state-saving instructions, based on the unique label, within each task section of the executable code, the state-saving instructions being defined by the multiple expansions of the "breakout" macro of the source code, and
    wherein, when the executable code is executed by the processor, the state-saving instructions of each task section being configured to save state information for that task section.

3. A method as in claim 2 wherein, when the executable code is executed by the processor, (i) the state-saving instructions of each task section are configured to store a next entry point's unique label address, and (ii) the "jump to address" section of that task section is configured to jump execution to that next entry point subsequently upon a next execution of that task section.

4. A method as in claim 1 wherein the set of task portions includes commands to monitor an environment of a data storage system; and wherein generating further includes incorporating instructions corresponding to the commands to monitor the environment of the data storage system.

5. A method as in claim 4 wherein the data storage system includes a set of processing devices configured to run a pre-emptive scheduling operating system which is separate from the multi-tasking executable program, the processor executing the executable code being different than the set of processing devices.

6. A method as in claim 5 wherein the data storage system further includes a user interface; and wherein at least one task portion defines a series of commands configured to receive input from a user and provide output to the user through the user interface.

7. A method of generating a monitoring program for a data storage system, the monitoring program using lightweight task-switching without running in conjunction with a pre-emptive scheduling operating system, wherein the method comprises:

writing source code in a high-level programming language (HLPL), the source code including a plurality of at least three monitoring routines, each monitoring routine of the plurality of monitoring routines including a plurality of distinct code segments;

placing, at the end of each code segment of each monitoring routine, a macro call to a breakout macro, the macro call being written in the HLPL;

writing additional source code in the HLPL, the additional source code including a macro definition for the breakout macro, such that, for each code segment of each monitoring routine, upon pre-processing, the breakout macro expands within the source code to:

an instruction defining a unique label associated with a next code segment of that monitoring routine; and an instruction to save a pointer to the unique label;

placing, at the beginning of each monitoring routine, a macro call to a jump macro, the macro call being written in the HLPL;

writing further source code in the HLPL, the further source code including a macro definition for the jump macro, such that, for each monitoring routine, upon pre-processing, the jump macro expands to instructions to jump to one code segment of that monitoring routine; and linking the source code to form the monitoring program, wherein for each code segment of each monitoring routine, an actual address of the unique label is resolved at link-time, the actual address of the unique label being different for each code segment.

8. A method as in claim 7 wherein writing the source code includes writing instructions for creating and maintaining a process array, the process array storing, for each monitoring routine, the pointer to the next code segment of that monitoring routine, the process array being indexed by a set of identifiers for each monitoring routine.

* * * * *